United States Patent [19]

Dumbaugh, Jr.

[11] Patent Number: 4,634,683

[45] Date of Patent: Jan. 6, 1987

[54] BARIUM AND/OR STRONTIUM ALUMINOSILICATE CRYSTAL-CONTAINING GLASSES FOR FLAT PANEL DISPLAY DEVICES

[75] Inventor: William H. Dumbaugh, Jr., Painted Post, N.Y.

[73] Assignee: Corning Glass Works, Corning, N.Y.

[21] Appl. No.: 790,370

[22] Filed: Oct. 23, 1985

[51] Int. Cl.$^4$ .................... C03C 14/00; C03C 3/085
[52] U.S. Cl. .......................... 501/32; 501/69
[58] Field of Search .................... 501/32, 69

[56] References Cited

U.S. PATENT DOCUMENTS

| | | | |
|---|---|---|---|
| 3,942,992 | 3/1976 | Flannery | 501/69 |
| 3,962,117 | 6/1976 | Reade | 501/69 |
| 4,012,263 | 3/1977 | Shell | 501/69 |
| 4,180,618 | 12/1979 | Alpha et al. | 501/69 |

*Primary Examiner*—Mark L. Bell
*Attorney, Agent, or Firm*—C. S. Janes, Jr.

[57] ABSTRACT

This invention is directed to the fabrication of flat panel display devices wherein a film of large crystal polysilicon is grown on a substrate. More specifically, this invention is drawn to the fabrication of such devices wherein the substrate is fashioned from a phase separated glass consisting essentially of extremely fine-grained crystals homogeneously dispersed in a glass matrix, the base glass therefor being essentially free from alkali metal oxide and consisting essentially, in mole percent, of 2–6% BaO and/or SrO, 18–26% $Al_2O_3$, and 68–80% $SiO_2$.

1 Claim, No Drawings

BARIUM AND/OR STRONTIUM ALUMINOSILICATE CRYSTAL-CONTAINING GLASSES FOR FLAT PANEL DISPLAY DEVICES

BACKGROUND OF THE INVENTION

Two recent technological advances have made large, flat pnel display devices a distinct practical possibility: (1) the preparation of liquid crystals exhibiting improved physical properties; and (2) the production of surface layers of fine-grained polysilicon.

The development of liquid crystals has progressed sufficiently such that miniature color television receiver sets can be made from them and much larger information display panels are technically feasible. However, liquid crystals inherently demonstrate slow responses to electrical signals and, therefore, a "switch" to rapidly respond to an electrical stimulus is required to set up an active matrix display. The thin film transistor (TFT) performs that function.

It is well recognized that a TFT can be fabricated from single crystal silicon; nevertheless, by the very nature of single crystal silicon, there is a limitation on the size of a TFT that can be prepared therefrom. It has been discovered that a fine-graind polysilicon layer which has been deposited onto a substarate can be re-crystallized to large-grained polysilicon through the scanning thereof with a heat source such as a laser. Further, it has been observed that a TFT produced from large-grained polysilicon manifests only slight deterioration in electrical properties when compared with those same characteristics exhibited by a TFT fabricated from single crystal silicon, and performs very satisfactorily in multiplexing a liquid crystal display.

A larger-grain polysilicon active matrix display requires a substrate which is transparent, flat, smooth, inert, compatible with silicon with respect to thermal expansion, and is capable of withstanding processing temperatures of at least 850° C. and, preferably, much higher, i.e., up to a temperature approaching 1000° C. U.S. application Ser. No. 790,369, filed concurrently herewith by me under the title STRONTIUM ALUMINOSILICATE GLASS SUBSTRATES FOR FLAT PANEL DISPLAY DEVICES, discloses glasses within a very narrow range of the ternary system $SrO-Al_2O_3-SiO_2$, viz., glasses consisting essentially, expressed in terms of mole percent on the oxide basis, of 9-12% SrO, 9-12% $Al_2O_3$, and 77-81% $SiO_2$, which, having annealing points in excess of 850° C., and, preferably, in excess of 875° C., are useful as substrates for large-grained polysilicon active matrices. Such glasses have, indeed, been recommended as operable substrates. However, as the technology progresses, it has been appreciated that resistance to even higher processing temperatures may quite likely be demanded. Consequently, glass forming compositions exhibiting linear coefficients of thermal expansion over the range of 25°-300° C. between about $30$-$40 \times 10^{-7}$/°C. and being capable of withstanding processing temperatures in excess of 900° C. and up to 1000° C. would be highly desirable.

In view of the above, the primary objective of the present invention is to provide a transparent glassy material chemically inert to silicon, but which is compatible with silicon with respect to thermal expansion through a linear coefficient of thermal expansion over the range of 25°-300° C. between about $30$-$40 \times 10^{-7}$/°C., and which exhibits an annealing point higher than 900° C. and, preferably, higher than 950° C.

SUMMARY OF THE INVENTION

I have found that objective can be achieved through a phase separated glass produced from compositions within a narrow range of the BaO and/or $SrO-Al_2O_3-SiO_2$ system and which are essentially free from alkali metal oxides, the phase separated glass consisting essentially of extremely fine-grained crystals homogeneously dispersed in a glass matrix. In the most general terms, the inventive products are prepared by heat treating precursor glass articles of proper compositions to cause the generation in situ of the desired crystals, the crystals comprising a minor proportion of the final product.

The precursor glass compositions demonstrate one very highly desirable characteristic; viz., they can be melted and formed into clear glass bodies at temperatures not exceeding about 1800° C. Temperatures in the vicinity of 1800° C. represent the practical limit for melting batches in contact with platinum and alloys thereof, and with most ceramic refractories utilized in an oxidizing environment.

The precursor glass bodies are phase separated by being subjected to a heat treatment between about 900°-1100° C. for a sufficient length of time to effect the in situ development of crystals in that portion of the body exposed to such heat treatment. Whereas exposure periods as brief as 0.5 hour will initiate growth of crystals, to insure substantially complete growth a period of about two hours has been deemed a practical minimum. Much longer periods of time can be employed but no significant advantages have been observed therefrom.

The crystals are extremely fine-grained; i.e., they have diameters smaller than the wavelength of light such that light scattering is reduced to a minimum. Accordingly, the glass remains essentially transparent.

The mechanism underlying the substantial increase observed in the annealing point of the inventive crystal-containing glasses has not been unequivocally elucidated. Two possible mechanisms have been hypothesized. Thus, the increase in the viscosity of the glass resulting in a higher annealing point may simply be due to the frictional effect of the crystals in the glass. On the other hand, because the crystals are so extremely small, precise identification thereof has been rendered difficult. Mullite ($3Al_2O_3.2SiO_2$) has been identified. However, because the annealing point of the phase separated body is raised by about 100°-150° C., it has been posited that at least a portion of the BaO and/or SrO has been removed from the glass composition to leave a residual glassy phase which is high in $Al_2O_3$ and $SiO_2$. Nevertheless, whatever may be the mechanism involved, the heat treatment permits transparent articles to be formed manifesting annealing points in excess of 1000° C.

Glasses satisfying the above objective can be prepared from essentially alkali metal oxide-free compositions consisting essentially, expressed in terms of mole percent on the oxide basis, of about 2-6% BaO and/or SrO, 18-26% $Al_2O_3$, and 68-80% $SiO_2$. The limits of the cited ranges must be stringently obeyed. For example, where the $SiO_2$ concentration exceeds 80%, the glass becomes too difficult to melt at 1800° C. Conversely, at $SiO_2$ levels below 68%, the annealing point is too low and/or the glass turns opal; i.e., it becomes translucent to opaque. Where the $Al_2O_3$ content is greater than 26%, the composition cannot be melted to a clear glass at 1800° C. In like manner to SiO$_2$, at Al$_2$O$_3$ concentrations below 18%, the glass turns opal upon heat treatment. The annealing point falls to an unacceptable value where the level of BaO and/or SrO exceeds about 6%, and a level below 2% generally results in a glass difficult to melt at 1800° C. and a glass which turns opal upon heat treatment.

Although a precise conversion of composition ranges expressed in mole percent to ranges expressed in weight percent is not possible, an approximation of the operable ternary systems stated in terms of weight percent comprises about 4–13% BaO, 25–36% Al$_2$O$_3$, and 54–68% SiO$_2$, and about 3–10% SrO, 26–37% Al$_2$O$_3$, and 55–71% SiO$_2$.

In general, glasses containing BaO alone will exhibit annealing points somewhat higher than those containing SrO alone. However, the linear coefficient of thermal expansion of those products containing BaO alone will typically be higher than those where SrO is present alone. On the other hand, BaO displays the very desirable capability of reducing the liquidus temperature of a glass without reducing the viscosity of the glass to any significant extent. That capability of BaO is of very practical importance since, by balancing the levels of BaO and SrO, it is possible to vary the coefficient of thermal expansion of the glasses in a controlled manner.

Unfortunately, BaO is subject to volatilization at temperatures in the vicinity of 1800° C. and higher. Therefore, steps must be taken to minimize environment pollution. SrO is much less subject to that problem.

As can be observed, the method for forming the inventive glasses comprises three general steps:

(a) a batch of a proper formulation is melted;

(2) that melt is cooled and a glass article of a desired geometry simultaneously shaped therefrom; and (3) that glass shape is heat treated at about 900°–1100° C. to generate crystals in situ.

PRIOR ART

BaO—Al$_2$O$_3$—SiO$_2$ and SrO—Al$_2$O$_3$—SiO$_2$ glasses are known to the art: *Phase Diagrams for Ceramists,* Levin, Robbins, and McMurdie, The American Ceramic Society, Columbus, Ohio (1964), pages 195 and 257, respectively. However, there is no indication therein of the unexpected utility of glasses coming within the narrow ranges of the present invention.

U.S. Pat. No. 3,467,534 discloses the preparation of glass-ceramic articles wherein a binary BaO—SiO$_2$ comprises the predominant crystal phase. Al$_2$O$_3$ is mentioned as an optional ingredient in amounts up to 3% by weight. Such concentrations are far below the minima required in the instant invention.

U.S. Pat. No. 4,180,618 describes the fabrication of electronic devices consisting of a thin film of silicon deposited upon a substrate, the substrate being composed of a glass consisting essentially, in weight percent, of 55–75% SiO$_2$, 5–25% Al$_2$O$_3$, and at least one alkaline earth oxide selected from the group in the indicated proportions of 914 15% CaO, 14–20% SrO, and 18–26% BaO. The levels of SrO and BaO are higher than can be tolerated in the present inventive glasses. Furthermore, there is no teaching with respect to heat treating those glasses to generate the development of very fine-grained crystals therein.

DESCRIPTION OF PREFERRED EMBODIMENTS

Table I reports a group of glass compositions, expressed in terms of mole percent on the oxide basis, illustrating the parameters of the instant invention. The actual batch ingredients may comprise any materials, either oxides or other compounds, which, when melted together, will be transformed into the desired oxide in the proper proportions. In the laboratory experimentation reviewed below, the batch materials comprised high purity sand, Al$_2$O$_3$, SrCO$_3$, and BaCO$_3$. Table IA lists the compositions of Table I as stated in terms of weight percent on the oxide basis.

The batch materials were compounded, ballmilled together to aid in obtaining a homogeneous melt, and charged into platinum-rhodium crucibles. The crucibles were introduced into a gas-oxygen fired furnace operating at about 1800° C. and the batches melted for about 16 hours. Thereafter, the melts were poured into an iron mold to form circularly-shaped slabs having a diameter of about 12″ and a thickness of about 0.75″, and those slabs were immediately transferred to an annealer.

TABLE I

|  | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| SiO$_2$ | 68 | 68 | 68 | 70 | 70 | 70 | 70 | 70 | 70 | 70 | 70 | 65 | 65 | 65 | 65 | 72 | 72 | 72 | 72 | 72 | 73 |
| Al$_2$O$_3$ | 25 | 27 | 28 | 20 | 22 | 23 | 24 | 25 | 26 | 27 | 28 | 25 | 27 | 30 | 32 | 22 | 23 | 24 | 25 | 26 | 22 |
| BaO | 7 | 5 | 4 | 10 | 8 | 7 | 6 | 5 | 4 | 3 | 2 | 10 | 8 | 5 | 3 | 6 | 5 | 4 | 3 | 2 | 5 |

|  | 22 | 23 | 24 | 25 | 26 | 27 | 28 | 29 | 30 | 31 | 32 | 33 | 34 | 35 | 36 | 37 | 38 | 39 | 40 | 41 | 42 |
|---|---|---|---|---|---|---|---|---|---|---|---|---|---|---|---|---|---|---|---|---|---|
| SiO$_2$ | 73 | 75 | 75 | 75 | 75 | 75 | 75 | 75 | 77 | 77 | 77 | 77 | 79 | 79 | 79 | 79 | 70 | 70 | 70 | 70 | 70 |
| Al$_2$O$_3$ | 24 | 15 | 17 | 19 | 20 | 21 | 22 | 23 | 18 | 19 | 20 | 21 | 16 | 17 | 18 | 19 | 25 | 26 | 24 | 23 | 22 |
| BaO | 3 | 10 | 8 | 6 | 5 | 4 | 3 | 2 | 5 | 4 | 3 | 2 | 5 | 4 | 3 | 2 | — | — | — | — | — |
| SrO |  |  |  |  |  |  |  |  |  |  |  |  |  |  |  | — | 5 | 4 | 6 | 7 | 8 |

TABLE IA

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| SiO$_2$ | 53.0 | 53.7 | 54.1 | 54.1 | 54.8 | 55.1 | 55.5 | 55.9 | 56.3 | 56.7 | 57.0 | 48.9 | 49.5 | 50.5 |
| Al$_2$O$_3$ | 33.1 | 36.2 | 37.8 | 26.2 | 29.2 | 30.8 | 32.3 | 33.9 | 35.5 | 37.1 | 38.8 | 31.9 | 34.9 | 39.6 |
| BaO | 13.9 | 10.1 | 8.1 | 19.7 | 16.0 | 14.1 | 12.2 | 10.2 | 8.2 | 6.2 | 4.2 | 19.2 | 15.6 | 9.9 |

|  | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| SiO$_2$ | 51.2 | 57.7 | 58.1 | 58.5 | 58.9 | 59.4 | 59.2 | 60.1 | 59.5 | 60.3 | 61.2 | 61.6 | 62.0 | 62.5 |
| Al$_2$O$_3$ | 42.8 | 30.0 | 31.6 | 33.2 | 34.8 | 36.4 | 30.4 | 33.6 | 20.2 | 23.2 | 26.3 | 27.9 | 29.5 | 31.1 |
| BaO | 6.0 | 12.3 | 10.3 | 8.3 | 6.3 | 4.2 | 10.4 | 6.3 | 20.3 | 16.5 | 12.5 | 10.5 | 8.5 | 6.4 |

|  | 29 | 30 | 31 | 32 | 33 | 34 | 35 | 36 | 37 | 38 | 39 | 40 | 41 | 42 |
|---|---|---|---|---|---|---|---|---|---|---|---|---|---|---|
| SiO$_2$ | 62.9 | 64.0 | 64.4 | 64.8 | 65.4 | 66.4 | 66.9 | 67.4 | 67.9 | 57.8 | 57.8 | 57.8 | 57.7 | 56.9 |

TABLE IA-continued

| | | | | | | | | | | | | | |
|---|---|---|---|---|---|---|---|---|---|---|---|---|---|
| $Al_2O_3$ | 32.8 | 25.4 | 27.0 | 28.7 | 30.3 | 22.9 | 24.5 | 26.1 | 27.7 | 35.1 | 36.5 | 33.7 | 32.3 | 31.8 |
| BaO | 4.3 | 10.6 | 8.6 | 6.5 | 4.3 | 10.7 | 8.6 | 6.5 | 4.4 | — | — | — | — | — |
| SrO | | | | | | | | | — | 7.1 | 5.7 | 8.5 | 10.0 | 11.3 |

Specimens were cut from each of the glass slabs. Some of those specimens were heat treated at about 1000° C. for about four hours and others at about 1000° C. for about 32 hours. Both treated and untreated specimens were visually inspected and then physical properties measured thereon utilizing conventional techniques. The annealing point in terms of °C. was determined in accordance with the beam bending method described in ASTM C598; the linear coefficient of thermal expansion (Coef. Exp.) in terms of $\times 10^{-7}/°C$. over the range of 25°–300° C. was determined in accordance with ASTM E228 utilizing a fused silica dilatometer. A qualitative appraisal of visual appearance (Appearance) was conducted on polished plates of about 2 mm thickness, and the percent transmittance (Transmittance) of the glass at 550 nm was measured on polished plates of about 2 mm cross section employing a Cary spectrophotometer. With regard to appearance, C indicates clear, i.e., essentially haze-free; H signifies the presence of a slight amount of haze, but wherein the product still manifested a transmittance of visible light greater than 80%; H+ designated articles wherein haze is present to such an extent that the visible transmittance is less than 80%, and 0 represents a opaque body.

A conjunctional study of Tables I and II unequivocally illustrates the necessity for maintaining the BaO, SrO, $Al_2O_3$, and $SiO_2$ levels within the prescribed ranges in order to produce glasses capable of being melted at temperatures no higher than about 1800° C. which, when heat treated at about 900°–1050° C., will phase separate such that extremely fine-grained crystals are generated in situ. The crystals comprise but a small fraction of the total product, substantially less than 50% by volume.

I claim:

1. A phase separated glass essentially free from alkali metal oxide consisting of extremely fine-grained crystals homogeneously dispersed in a glass matrix, said glass exhibiting transparency, an annealing point higher than 900° C., a linear coefficient of thermal expansion over the temperature range of 25°–300° C. between about $30-40 \times 10^{-7}/°C$., and consisting essentially, expressed in terms of mole percent on the oxide basis, of about $SiO_2$: 68–80
$Al_2O_3$: 18–26
BaO and/or SrO: 2–6.

* * * * *

TABLE II

| Example | Annealing Point Heat Treatment | | | Coef. Exp. Heat Treatment | | | Appearance Heat Treatment | | | Transmittance Heat Treatment | | |
|---|---|---|---|---|---|---|---|---|---|---|---|---|
| | None | 4 hrs. | 32 hrs. | None | 4 hrs. | 32 hrs. | None | 4 hrs. | 32 hrs. | None | 4 hrs. | 32 hrs. |
| 1 | 869 | 901 | 936 | 30.7 | 37.5 | 38.2 | C | H+ | H+ | 91 | 55 | 74 |
| 2 | 873 | 928 | 939 | 28.7 | 38.8 | 38.6 | C | C | H+ | 89 | 86 | 73 |
| 3 | Heavily devitrified upon cooling from melt | | | | | | | | Devitrified | | | |
| 4 | 868 | — | 868 | 33.0 | — | — | C | — | C | — | — | — |
| 5 | 867 | — | 964 | 30.3 | — | 38.8 | C | — | O | — | — | — |
| 6 | 865 | — | 958 | 28.8 | — | 38.9 | C | — | O | — | — | — |
| 7 | 868 | — | 942 | 27.7 | — | 36.2 | C | — | O | — | — | — |
| 8 | 881 | 976 | 965 | 27.7 | — | 35.6 | C | C | H | 90 | 88 | 82.5 |
| 9 | 880 | — | 975 | 26.0 | — | 34.4 | C | — | C | — | — | — |
| 10 | Heavily devitrified upon cooling from melt | | | | | | | | Devitrified | | | |
| 11 | Heavily devitrified upon cooling from melt | | | | | | | | Devitrified | | | |
| 12 | 868 | 871 | 971 | 33.1 | 33.1 | 42.3 | C | H | O | 89 | 85 | 0 |
| 13 | 874 | 887 | 935 | 31.2 | 39.0 | 41.9 | C | H | O | 88 | 84 | 0 |
| 14 | Heavily devitrified upon cooling from melt | | | | | | | | Devitrified | | | |
| 15 | Heavily devitrified upon cooling from melt | | | | | | | | Devitrified | | | |
| 16 | 878 | 890 | 958 | 26.8 | 30.6 | 37.2 | C | C | O | 91 | 89 | 0 |
| 17 | 881 | 916 | 966 | 25.9 | 33.3 | 33.6 | C | H | H | 89 | 86 | 84 |
| 18 | 987 | 985 | 1031 | 31.9 | 33.8 | 33.8 | C | H+ | H | 89 | 86 | 74 |
| 19 | 875 | 1000 | 994 | 25.0 | 31.4 | 32.5 | C | H | H | 90.5 | 83 | 82 |
| 20 | 921 | 1020 | — | 25.8 | 29.5 | 29.9 | H | H+ | H+ | 83 | 76 | 72 |
| 21 | 887 | 924 | 972 | 26.3 | 30.5 | 34.8 | C | H | H+ | 91 | 84 | 77 |
| 22 | 1002 | 1000 | 1015 | 28.7 | 30.6 | 30.4 | H | H | H | 90 | 86 | 86 |
| 23 | 884 | 881 | 884 | 34.1 | 34.7 | 35.0 | C | C | C | 91 | 91 | 89 |
| 24 | 878 | 876 | 881 | 29.3 | 29.6 | 28.7 | C | C | H | 89 | 91 | 85 |
| 25 | 876 | 903 | 957 | 25.5 | 25.9 | 34.1 | C | H | — | 91 | 61 | — |
| 26 | 890 | — | 970 | 24.5 | — | — | C | O | — | — | — | — |
| 27 | 908 | 972 | 978 | 27.0 | 31.5 | 32.7 | C | H | H | 91 | 86 | 87 |
| 28 | 901 | 1004 | 1005 | 22.3 | 30.8 | 29.7 | C | H+ | H | 87 | 70 | 85 |
| 29 | 978 | 1021 | 1017 | 26.0 | 27.1 | 28.4 | H | H+ | H+ | 85 | 78 | 78 |
| 30 | 881 | 884 | 910 | 22.5 | 27.8 | 33.2 | H | H | H | — | — | — |
| 31 | 896 | 979 | 987 | 23.1 | 30.2 | 30.4 | C | C | C | 91 | 91 | 89 |
| 32 | 1003 | 1006 | 1006 | 26.8 | 30.3 | 29.5 | C | C | H+ | 91 | 90 | 69 |
| 33 | 1015 | 1016 | 1022 | 24.2 | 26.1 | 26.7 | C | C | H+ | 92 | 88 | 69 |
| 34 | 885 | 883 | 889 | 22.6 | 23.5 | 23.5 | H | H | H+ | 85 | 85 | — |
| 35 | 889 | 911 | 985 | 21.6 | 29.8 | 29.4 | C | C | H | 92 | 88 | 82 |
| 36 | 906 | 997 | 1009 | 21.8 | 26.8 | 28.6 | C | H+ | H | 92 | 70 | 87 |
| 37 | 916 | 1012 | 1028 | 21.2 | 29.9 | 26.8 | C | H | H+ | 89 | 84 | 63 |
| 38 | 881 | — | 965 | 26.6 | — | 33.5 | — | — | H+ | — | — | — |
| 39 | 870 | — | 940 | 27.4 | — | 34.9 | — | — | C | — | — | — |
| 40 | 855 | — | 889 | 27.4 | — | 35.9 | — | — | H+ | — | — | — |
| 41 | 852 | — | 902 | 27.1 | — | 37.1 | — | — | O | — | — | — |
| 42 | 847 | — | 942 | 28.9 | — | 38.3 | — | — | O | — | — | — |